United States Patent [19]

Christe

[11] 3,987,152

[45] Oct. 19, 1976

[54] STABLE UNSUBSTITUTED SULFONIUM SALTS

[75] Inventor: Karl O. Christe, Calabasas, Calif.

[73] Assignee: Rockwell International Corporation, El Segundo, Calif.

[22] Filed: Aug. 28, 1975

[21] Appl. No.: 608,601

[52] U.S. Cl. .............................. 423/467; 423/511; 423/563; 423/644

[51] Int. Cl.² ........................................ C01B 17/45

[58] Field of Search ............ 423/467, 511, 563, 644

[56] References Cited

UNITED STATES PATENTS 3,000,694  9/1961  Smith et al. ...................... 423/467 X

OTHER PUBLICATIONS

Ruff et al. "Berichte" vol. 39, 1906, p. 4315 (Gmelins Handbuch Der Anorganischen Chemie., p. 402).

*Primary Examiner*—Jack Cooper
*Attorney, Agent, or Firm*—L. Lee Humphries; Robert M. Sperry

[57] ABSTRACT

A stable unsubstituted sulfonium salt and method of isolating same.

2 Claims, No Drawings

STABLE UNSUBSTITUTED SULFONIUM SALTS

The invention herein described was made in the course of or under a contract of subcontract thereunder, (or grant) with the Department of the Navy.

BACKGROUND OF THE INVENTION

1. Field of the Invention

This invention relates to compositions of matter and is particularly directed to stable unsubstituted sulfonium salts and methods of isolating same.

2. Description of the Prior Art

Hydrogen sulfide has been found to be extremely useful as a reagent in forming numerous chemical compounds. However, the storage of hydrogen sulfide is hazardous due to its extreme toxicity and high volatility. Numerous attempts have been made to overcome these problems or to avoid such problems by providing a source of hydrogen sulfide which would not be subject to these problems, but which could be actuated, as desired, to supply the needed hydrogen sulfide. However, none of the prior art techniques have been entirely satisfactory. Thus, it has been known that the foregoing problems could be somewhat alleviated by using iron sulfide and, when desired, reacting this with hydrochloric acid to generate hydrogen sulfide. While this technique is effective, it still involves handling and storage of a highly corrosive acid.

BRIEF SUMMARY AND OBJECTS OF THE INVENTION

These disadvantages of the prior art are overcome with the present invention and a novel technique is provided for producing hydrogen sulfide while avoiding the problems of the prior art as set forth above. The advantages of the present invention are obtained by producing stable, solid, unsubstituted sulfonium salts which, when mixed with water, react to release hydrogen sulfide.

Stable alkyl sulfonium salts have been known heretofore and are very important, in industry, as detergents, etc. However, unsubstituted sulfonium salts have only been previously known to exist at low temperatures, of the order of $-30°$ C, and in super-acid solutions, such as fluorosulfonic acid. Many papers have referred to sulfonium salts in solution. However, none of the prior art has suggested how these salts could be isolated. In contrast, Applicant has discovered a simple method for isolating stable solid unsubstituted sulfonium salts by protonation of $H_2S$ in $HF + SbF_5$.

Accordingly, it is an object of the present invention to provide an improved technique for generating hydrogen sulfide.

Another object of the present invention is to provide a method of generating hydrogen sulfide which does not involve storage or handling of hazardous materials.

An additional object of the present invention is to provide stable solid unsubstituted sulfonium salts.

A further object of the present invention is to provide a method for producing stable solid unsubstituted sulfonium salts.

A specific object of the present invention is to provide a method of producing stable solid unsubstituted sulfonium salts by protonation of $H_2S$ in $HF + SbF_5$.

These and other objects and features of the present invention will be apparent from the following detailed description.

DETAILED DESCRIPTION OF THE INVENTION

In that form of the present invention chosen for purposes of illustration, protonation of hydrogen sulfide in $HF-SbF_5$ will produce a stable solid unsubstituted sulfonium salt.

EXAMPLE 5.38 mmol of $SbF_5$ and 10 ml of liquid anhydrous HF were combined at $-196°$ C in a Teflon ampule. The mixture was warmed to $25°$ C to given a homogenous solution. Thereafter, the solution was cooled to $-196°$ C and 7.10 mmol of hydrogen sulfide was added. The mixture was warmed to $-78°$ C, then slowly to $25°$ C. During the warm-up, a white solid formed, which was only partially soluble in the excess of HF. The volatile products were removed at $25°$ C in vacuo, leaving 1.452g of a white stable solid. The calculated weight for 5.38 mmol of $SH_3^+SbF_6^-$ is 1.457g. Moreover, the calculated microanalytical values for $SH_3SbF_6$ are Sb 44.95 and S 11.85 while the values obtained by measurement of the white solid are Sb 44.8 and S 11.9. Accordingly, it is concluded that the white solid is $SH_3^+SbF_6^-$. It was found that this material can be stored indefinitely at $25°$ C in Teflon containers.

To use the sulfonium salts to generate hydrogen sulfide, it has been found that the sulfonium salts react with water according to the formula:

$$SH_3^+SbF_6^- + H_2O \rightarrow H_3O^+SbF_6^- + H_2S \uparrow$$

Thus, the sulfonium salt can be stored safely as a stable solid and, when desired, can be combined with water to release $H_2S$.

Obviously, numerous variations and modifications can be made without departing from the present invention. Accordingly, it should be clearly understood that the forms of the present invention described above are illustrative only and are not intended to limit the scope of the present invention.

What is claimed is:

1. An unsubstituted sulfonium salt having the formula $SH_3^+SbF_6^-$ which is a solid that is stable at $25°$ C.

2. The method of producing $SH_3^+SbF_6^-$ consisting of the steps of:
    forming a homogenous mixture of $SbF_5$ and liquid anhydrous HF,
    cooling said mixture to $-196°$ C,
    adding hydrogen sulfide, and
    gradually warming the resulting mixture until a white solid is formed.

* * * * *